United States Patent Office 2,800,503
Patented July 23, 1957

2,800,503

PURIFICATION OF NEUTRAL OR BASIC ORGANIC SULFONATES

Gifford W. Crosby, River Forest, and Le Roi E. Hutchings, Crystal Lake, Ill., assignors to The Pure Oil Company, Chicago, Ill., a corporation of Ohio No Drawing. Application December 6, 1954, Serial No. 473,454

10 Claims. (Cl. 260—504)

This invention relates to the purification of organic sulfonates. It is especially concerned with recovery of the sulfonates from a neutralized sulfonation reaction mixture by precipitation of the sulfonates therefrom to effect the separation from unsulfonated oil.

The reaction between a sulfonating agent and an organic compound to effect the union of the sulfonic acid group, —$SO_3H$, with a carbon atom of the organic nucleus produces a product mixture which is responsive to a number of different processes for the recovery of the sulfonic acids and their salt derivatives therefrom. Although processes are available for the recovery of the sulfonic acids per se, it is often preferred to neutralize the sulfonic acids and recover the neutral or basic salts of the sulfonic acids thus produced. A number of processes are employed to recover the sulfonate. One type of process, viz., solvent extraction, employs a substance which will exert a selective solvent action on the sulfonate in unsulfonated oil, but will not dissolve the inorganic salts present in the reaction mass. The phase separation that results in this type of process permits the isolation of an oil and solvent solution of the sulfonate from the product mixture. Upon recovery of the solvent an oil solution of sulfonate is obtained. A number of solvents have been used to hold the sulfonates in solution while insoluble impurities formed during the neutralization are removed. Examples of such solvents include ethyl alcohol, acetone, dioxane, butyl alcohol, light petroleum distillates, halogenated hydrocarbons, ethyl ethers, etc., and in general, hydrocarbons, alcohols, aldehydes, ketones, carboxylic acids, esters, ethers, amino- compounds, nitro-compounds, heterocyclic compounds, halogenated derivatives, and mixtures thereof. It has now been found that under proper conditions some of these selective solvents will function as precipitants to bring about the deposition of the sulfonate from the oil solution in which it is normally prepared. By employing this discovery, greater effectiveness in producing purer sulfonates in more concentrated form is obtained. An oil-free sulfonate can be obtained without the effort and expense associated with carrying out distributions of crude sulfonates between two liquid phases, such as petroleum ether and aqueous alcohol, and subsequent processing of both phases to recover products and solvents, as required by conventional purification processes in common use.

It is therefore a primary object of this invention to recover sulfonates from a neutralized reaction mixture resulting from the reaction of an organic reactant and a sulfonating agent by means of an organic precipitant. This and other objects will be made more apparent from the following detailed discussion of the instant invention.

As an alternate method in the recovery of sulfonates, precipitative techniques have frequently been employed. The most commonly practiced form of this type of recovery involves the precipitation of sulfonates by "salting out" the sulfonates from aqueous solution. In this expedient the addition of water-soluble inorganic salts, such as sodium chloride, sulfate, nitrate, or acetate, or soluble metallic salts of copper, zinc, nickel, etc., to the sulfonation mixture results in the precipitation of the sulfonates. Also employed as precipitants are various organic materials. For example, in the recovery of sulfonates as a by-product obtained from the light oils derived in the by-product coking of coal, a light aliphatic petroleum distillate, such as kerosene and gasoline, may be employed. Organic bases, such as aniline, have also been used to precipitate water-soluble sulfonic acids from aqueous solutions containing impurities. According to this invention it has been found that the recovery of oil-soluble sulfonates by precipitation may be effected by employing a number of substances which normally function as selective solvents in processes for purifying organic sulfonates by precipitation or water-extraction of inorganic impurities. In carrying out the process of this invention, the sulfonates contained in a reaction mass resulting from the neutralization of the reaction product formed from the interaction of a sulfonating agent and an organic substance can be precipitated by the addition of a normally liquid precipitant selected from the group consisting of aliphatic mono- and dichlorides, acyclic and cyclic polyethers, and chlorinated ethers, to the sulfonate-containing reaction mass. Examples of suitable agents for use in this invention include such aliphatic mono- or dichlorides as ethylene chloride, propylene chloride, methylene chloride, ethyl chloride, propyl chloride, etc.; cyclic polyethers, such as the dioxanes and trioxymethylene, etc.; and acyclic polyethers, such as polyoxyalkylene glycol having 4 to 8 carbon atoms per molecule; and chlorinated ethers, e. g., dichloroethyl ether. Quite obviously, different conditions are required to bring about the precipitation of the sulfonate from the neutralized reaction mixture than are necessary for holding the sulfonate in solution as occurs in the established processes for removal of inorganic impurities. Accordingly, the related process variables, precipitant-sulfonate ratio and temperature, must be controlled. The volume ratio of precipitant to sulfonate should fall between 3–20:1, preferably between 8–12:1, and the temperature should be in the range, 20°–150° F. The optimum precipitant-sulfonate ratio and temperature will depend principally on the particular sulfonate being processed.

The following examples are illustrative of the instant invention:

A reaction mixture comprising 1 volume of a 200 vis. neutral petroleum oil, 0.036 volume $SO_3$ sulfonating agent, and 1.2 volumes of $SO_2$ diluent were contacted in a Dewar flask reactor for about 15 minutes at a temperature of 14° F. During the reaction period self-cooling of the reaction mixture was effected by the controlled evaporation of part of the $SO_2$ diluent. After removal of the reaction product from the reactor, the remaining $SO_2$ was stripped from the reaction product and the reaction product neutralized with 30% by weight, based on the crude sulfonic acids and oil present in the reaction product, of $Ba(OH)_2 \cdot 8H_2O$. Resulting from the neutralization step was a liquid product having a total base number of 50.7 and an ash content as sulfate of 18.3%.

One volume of this liquid product, containing about 40% basic barium petroleum sulfonate and 60% unsulfonated petroleum oil, was shaken with ten volumes of dioxane at 75° F. The product split into a liquid phase and a semi-solid phase. After settling, the dioxane-containing liquid phase was decanted from the sulfonate-containing semi-solid phase, and the latter phase was again treated with ten volumes of dioxane to effect a phase separation as above, and decanted s before. The resulting semi-solid sulfonate phase, which was separated and dried by heating, to 350° F., yielded 34% by weight, based on original sulfonate plus oil, of a tan-colored solid having a total base number of 106 and an ash as Sulfate of 41.7% by weight. This product represented an 80% by weight recovery of basic petroleum sulfonate with an approximate purity of 85%.

In another example, one volume of the same, crude basic barium sulfonate product was treated with ten volumes of ethylene chloride at 75° F. to produce a liquid phase and a semi-solid phase. To facilitate phase separation, the mixture was centrifuged and the resulting ethylene-chloride-containing liquid phase was removed from the sulfonate-containing semi-solid phase by decantation. Any traces of ethylene chloride were stripped from the solid sulfonate phase by passing nitrogen therethrough at 250–300° F. This product, having a total base number of 127, representing an approximate purity of 100%, constituted 8.8% by weight of the crude sulfonate, representing a sulfonate recovery of 22%.

Although the recovery of the basic barium petroleum sulfonate by precipitation could be effected by employing the precipitants of this invention, precipitative separation of the desired sulfonate could not be produced by such other well-known selective solvents as carbon tetrachloride, chloroform, pentane or ether.

Although satisfactory recovery of the sulfonate generally can be effected by means of a single contact, it may be desired to employ a multistage contact extraction in order to obtain high purity.

The recovery of the precipitate from the precipitant-treated reaction mass can be effected by settling, centrifuging, filtration or other equivalent means for separating solids from a liquid. The wet precipitate may be dried, if desired, in convenional drying equipment.

Although the foregoing examples are directed to the recovery of so-called petroleum sulfonates, the instant invention is not so limited and may be employed in the recovery of sulfonates produced from organic charge stocks other than petroleum fractions by any of the sulfonation processes well known in the prior art. Basically, these processes, with which the instant invention is co-operative, are those which comprise reacting a sulfonatable organic material with a sulfonating agent and neutralizing the sulfonic acids in the resulting reaction mixture with a basic reagent to produce a neutral or basic sulfonate. This invention is concerned with the efficient recovery of the sulfonates from the reaction mixture in concentrated form. The sulfonation reaction can be carried out using a wide variety of sulfonating agents, including sulfur trioxide, sulfuric acid, oleum, chlorosulfonic acids, etc. However, it is preferred to employ sulfonating agents such as sulfur trioxide which are used in the presence of a stoichiometric excess of sulfonatable reactant. When such an expedient can be employed it precludes the formation of inorganic substituents, the presence of which may be undesirable for various applications of the sulfonate. The instant invention is particularly adaptable to the processing of sulfonates derived from various types of mineral oil fractions. Petroleum oils most suitable for sulfonation include solvent-, or acid-refined, dewaxed distillate fractions which have viscosities in the range of 100–600 SUS at 100° F., but other fractions such as residue and aromatics extracts also may be processed if large amounts of sludge and worthless by-products, such as tars, and less clean operation are of no great concern. The sulfonic acid thus produced may be neutralized to produce neutral or basic sulfonates by the use of either inorganic or organic bases, such as metallic oxides and hydroxides, and ammonia and its derivatives, such as amines, alkanolamines and other basic aliphatic or aromatic compounds containing trivalent nitrogen. If desired, the sulfonates recovered by means of the instant invention may be converted to sulfonates having other desired cations by metathetically reacting solutions of the sulfonates produced by means of the instant invention with soluble inorganic salts of the cation desired.

The instant invention is particularly effective in the production of petroleum sulfonates for use as lubricating oil and grease additives whereby the finished additive is used as a solution in the mineral oil base employed in the composition without any intermediate purification step to eliminate unsulfonated mineral oil usually found associated with the oil-soluble sulfonic acids from other processes. However, depending upon the cation employed, petroleum sulfonates may also be used as detergents, emulsifiers, emulsion breakers, wetting agents in textile operations and the formulation of insecticides, leather softeners in the tanning industry, etc. Likewise, the sulfonates prepared from other organic materials have a wide variety of uses in the textile, leather, paper, glue and other industries.

Accordingly, we claim as our invention:

1. A method for recovering organic sulfonates from a neutralized sulfonation reaction mass containing unsulfonated residue which comprises contacting said mass at a temperature of about 20°–150° F. with an organic precipitant selected from the group consisting of aliphatic mono- and dichlorides, acyclic and cyclic polyethers, and chlorinated ethers in the volume ratio of precipitant to sulfonation reaction mass of about 3–20:1, whereby said reaction mass is separated into a precipitant-containing liquid phase and a sulfonate-containing semi-solid phase substantially free from unsulfonated residue.

2. A method in accordance with claim 1 in which said organic sulfonates are derived from petroleum oils.

3. A method for producing organic sulfonates which comprises contacting a sulfonatable organic material with a sulfonating agent to produce a crude sulfonic acids product, neutralizing said product with a basic reagent, contacting the neutralized crude product containing unsulfonated residue at a temperature of about 20°–150° F. with a precipitant selected from the group consisting of aliphatic mono- and dichlorides, acyclic and cyclic polyethers, and chlorinated ethers in the volume ratio of precipitant to neutralized crude product of about 3–20:1 to effect the separation of said neutralized product into a precipitant-containing liquid phase and a sulfonate-containing semi-solid phase substantially free from unsulfonated residue, separating said phases, and removing residual amounts of liquid from said semi-solid phase to produce a substantially dry solid.

4. A method in accordance with claim 3 in which the precipitant is dioxane.

5. A method in accordance with claim 3 in which the precipitant is ethylene chloride.

6. A method for producing a concentrate of a metal sulfonate from lubricating oil which comprises contacting a lubricating oil fraction with a sulfonating agent to produce a crude sulfonic acids product containing unsulfonated residue, neutralizing said product with a basic compound of the desired metal, contacting the neutralized crude product at a temperature of about 20°–150° F. with a precipitant selected from the group consisting of aliphatic mono- and dichlorides, acyclic and cyclic polyethers, and chlorinated ethers in a volume ratio of precipitant to neutralized crude product of about 3–20:1 to effect the separation of said mass into a liquid phase and a sulfonate-containing semi-solid phase substantially free from unsulfonated residue, and separating said phases.

7. A method in accordance with claim 6 in which the lubricating oil fraction is a solvent-refined, dewaxed, neutral oil with a viscosity between about 100 and 600 SUS at 100° F.

8. A method in accordance with claim 6 in which said neutralizing is carried out with a basic barium compound.

9. A method in accordance with claim 6 in which said precipitant is dioxane.

10. A method in accordance with claim 6 in which said precipitant is ethylene chloride.

References Cited in the file of this patent
UNITED STATES PATENTS

| | | |
|---|---|---|
| 2,050,345 | Liberthson | Aug. 11, 1936 |
| 2,140,263 | Kessler et al. | Dec. 13, 1938 |
| 2,168,315 | Blumer | Aug. 8, 1939 |
| 2,307,953 | Potter | Jan. 12, 1943 |
| 2,373,793 | Susie | Apr. 17, 1945 |